United States Patent [19]

Ek et al.

[11] Patent Number: 4,866,116

[45] Date of Patent: Sep. 12, 1989

[54] COMPOSITION FOR COATING, SEALING, AND PROTECTING PURPOSES

[75] Inventors: Rolf L. Ek, Täby; Sune B. Nygren, Sollentuna, both of Sweden

[73] Assignee: Procoat Scandinavia Aktiebolag, Sollentuna, Sweden

[21] Appl. No.: 16,375

[22] PCT Filed: May 23, 1986

[86] PCT No.: PCT/SE86/00240

§ 371 Date: Jan. 22, 1987

§ 102(e) Date: Jan. 22, 1987

[87] PCT Pub. No.: WO86/07084

PCT Pub. Date: Dec. 4, 1986

[30] Foreign Application Priority Data

May 24, 1985 [SE] Sweden ............................. 8502581

[51] Int. Cl.⁴ .................... B05D 1/02; C08K 3/22; C08K 3/34; C08L 75/04

[52] U.S. Cl. .................................. 524/430; 427/421; 427/422; 523/434; 524/437; 524/450; 524/507; 525/111; 525/123

[58] Field of Search ............... 520/111; 523/434; 427/421, 422; 524/507, 430, 437, 450; 528/67; 525/123

[56] References Cited

U.S. PATENT DOCUMENTS

| | | | |
|---|---|---|---|
| 2,998,403 | 8/1961 | Miller et al. | |
| 3,245,946 | 4/1966 | O'Conner et al. | 524/450 |
| 3,271,352 | 9/1966 | Weinberg | 524/450 |
| 4,165,344 | 8/1979 | Okuaa et al. | 525/111 |
| 4,292,213 | 9/1981 | Elliott et al. | 523/434 |
| 4,489,177 | 12/1984 | O'Conner et al. | 528/67 |
| 4,657,953 | 4/1987 | Kajo et al. | 525/111 |

FOREIGN PATENT DOCUMENTS

| | | |
|---|---|---|
| 1921832 | 11/1970 | Fed. Rep. of Germany . |
| 2447625 | 4/1976 | Fed. Rep. of Germany . |
| 1720059 | 1/1978 | Fed. Rep. of Germany . |
| 2412353 | 7/1979 | France . |
| 399915 | 3/1978 | Sweden . |
| 2023624 | 1/1980 | United Kingdom . |
| 2035336 | 6/1980 | United Kingdom . |
| 2119806 | 11/1983 | United Kingdom . |

OTHER PUBLICATIONS

*Derwent' Abstract*, No. 83-787 501/41, SU 979 481 A, see lines 1-5 and 15.

*Primary Examiner*—Allan M. Lieberman
*Attorney, Agent, or Firm*—Brumbaugh, Graves, Donohue & Raymond

[57] ABSTRACT

Composition for coating, filling, binding and protection, comprising rubber, whereby it comprises rubber having a particle size of at most 0.4 mm present in an amount of 20-50% by weight, and a curable polymer base present in an amount of 40-50% by weight, which components after curing of said polymer base are the elastic and adhesive part of the composition. The invention further relates to a process for preparation, and a process for applying said composition.

8 Claims, No Drawings

COMPOSITION FOR COATING, SEALING, AND PROTECTING PURPOSES

TECHNICAL FIELD

The present invention relates to a composition for coating, tightening, and protecting purposes, a process for its preparation, as well as a process for its application.

The object of the present invention is to obtain a composition, which can be used as a coating of surfaces, which are subject to corrosion, and mechanical attacks; as a sealing agent for water and other liquids at tube joints, roofing, point-sealing of ceramic tiles, metal sheets, and the like, and which composition is very resistant to mechanical wear and attacks by chemicals including water.

BACKGROUND OF THE INVENTION.

SE-A-7709649-3 describes a corrosion resistant coating composition, particularly for external rust protection of vehicle chassies, which composition consists of a polyurethane polymer, waste rubber, water free black coal tar, zeolitic drying agent. This composition fulfills generally its object, but has some disadvantages by strongly smelling of black coal tar, which prevents it from being used in more restricted spaces, and means that well ventilated spaces are required for application, as well. Further, the black coal tar leads to the fact that the coating obtains a black colour, which often may not be of importance, but as often is not acceptable, therefore one demands in stead a pigmented product with a colour pigment by choice. Besides these drawbacks, which are of a certain cosmetic nature, one often requires a still higher wearing resistance, resistance against attach by chemicals, particularly in alkaline environment, and temperature stability.

DESCRIPTION OF THE PRESENT INVENTION

It has now surprisingly been shown possible to be able to eliminate these problems by the present invention, which is characterized in that it contains rubber with a particle size of at most 0.4 mm, and present in an amount of at most 50% by weight, and an isocyanate curable polymer base of the polyhydroxy type in an amount of 40–55% by weight, a polymer curing isocyanate in an amount of 18–30% by weight, and an aliphatic polyether glycol in an amount of 1 to 5% by weight.

Further characteristics are evident from the accompanying claims.

The curable prepolymer is preferably an isocyanate curable polyurethane (DESMODUR-hardener; DESMOPHEN 1150-prepolymer) but also isocyanate curable epoxy polymers can be used.

Suitable binding agents of polymer type which are curable by isocyanate active hardeners are different polyols, polyester bases, having a molecular weight of 200 and more. Other polymer materials are epoxy resins which are primarily dissolved in a keton, or a glycol ether, and are then cured using an isocyanate active hardener (e.g., DESMODUR) or amino group active hardener. Suitable epoxy resins have a molecular weight of 1000 or more.

The polyols used can either be agents, such as DESMOPHEN 1150, or the like, and/or aliphatic glycols, such as ethylene glycol, diethylene glycol, triethylene glycol.

All types of rubber can be used as a rubber material, such as waste rubber, waste rubber tires, raw rubber, and other rubber qualities.

Thus it has turned out that 20–40% by weight of rubber powder, suitably waste rubber, having a particle size of <0.4 mm, preferably 0.05–0.2 mm, 40–50% by weight of a polymer base, 1–5% by weight of an aliphatic polyether glycol base, and 18–25% by weight of an isocyanate hardener give excellent products within the scope of the present invention. Thus these compositions have, in cured state, a very high elasticity, and wearing resistance. In the case the polyester base contains moisture a zeolite drying agent should be added, alternatively active aluminium oxide, or basic aluminium silicates.

EXAMPLE 1.

40 parts per weight of waste rubber having a particle size of 0.1–0.2 mm were immediately mixed with a mixture of 40 parts per weight of DESMOPHEN 1150, and 2 parts per weight of polyether glycol (triethylene glycol). To this comixture then 18 parts per weight of an isocyanate active hardener (DESMODUR) were added for the curing of the polymers. The composition prepared was used for the preparation of different test coatings for testing.

A product of Example 1 above (A) was tested and compared with a product (B) of SE-A-7709649-3, the Example, with regard to wearing resistance, heat resistance, adherence to steel, and chemical resistance.

Wearing resistance

Plates with applied coatings of above were handled in a tumbler for 5 days (120 hrs) together with 200 g of stones. The volume of material having been worn off, given in mm$^3$, was then measured.

A = 19 mm$^3$

B = 105 mm$^3$

Cylindrical test bodies of the respective product were forced over an emery-cloth having 60 particles per cm$^2$ with a pressure of 5 N, and length of 20 m, whereupon the volume worn off was determined.

A = 145 mm$^3$

B = 470 mm$^3$

Heat resistance

Plates with applied coating were hung vertically for 2 days (48 hrs) at different temperatures, the samples/plates were then acclimatized to ambient temperature (20° C.), whereupon they were checked ocularly.

A = withstand 150° C.

B = withstand 80° C.

Adherence to steel

Coatings on steel were tested for traction for determining the adherence ability.

A = withstand 4.0 MPa prior to burst

B = withstand 0.8 MPa prior to burst

Chemical resistance

Test coatings of the respective products were subjected to different oils, whereby one could generally determine that sample B miscoloured all such liquids, while sample A did not give any miscolouration. At testing in acidic aqueous environment (HCl 30%; $HNO_3$ 10%; $H_2SO_4$ 10%; or $CH_3COOH$ 50%) the resistance is just about the same. In an alkaline aqueous environment (NaOH or $NH_{4OH}$) sample A is better.

The water vapour permeability is less for sample A than it is for sample B.

Application

Sample A can be applied in thicker layers (2.5–3 mm) on vertically hanging testing plates compared with sample B which allows 1.5 mm, only. In connection with the preparation of the present composition one should preferably put the product under vacuo, whereby, in particular, the wearing resistance, and the chemical resistance are further improved. Furthermore, the aging resistance, moisture resistance, and the traction strength are improved. The pressure in the vacuo step for elimination of air should be 0.8 bar, but can in case of very highly viscous compositions be further reduced down to 0.5–0.6 bar. The mixture is subjected to a vacuum of at least 0.9 bar. Application of the composition can be effected in different ways, such as by means of simple manual painting, by mechanical painting, as well as by means of high pressure spraying. At high pressure spraying a modified conventional high pressure spraying apparatus of two-component type is suitably used, wherein the composition, exclusive of hardener, and hardener are brought together prior to the outlet of a mixing tube (mixer) and is brought forward to a spraying gun via a heat taped high pressure hose. The pressure on the composition shall be so high that a well distributed spraying mass is obtained (atomized), which, at viscosities of the composition normally appearing, is obtained at 160–200 $kg/cm^2$ and a temperature of >40° C., preferably 40°–80° C., more preferably 45°–60° C.

Normally the viscosity of the composition is such that the high pressure pump as such does not manage to draw the composition into the apparatus at normal temperature. Thus, a pressure plate has been arranged to the high pressure spray apparatus, with success, which plate fits snuggly into the vessel where the composition is prepared, whereupon the pressure plate is pressed down into the preparation vessel either mechanically, pneumatically, or hydraulically, so that the composition is pressed up into the high pressure spray apparatus.

In order to increase the curing of the composition above an accelerator of the curing reaction can be added in an amount of 0.1–0.5% by weight Examples of such accelerators are dibutyl distannium dilaurate, or corresponding lead compounds.

In order to reduce the risk a flame retarder can be added to the composition such as a phosphite compound, which is added in an amount of 5–15 % by weight. Nowgard V-4 is an example of a retarder.

The composition can be made thixotropic as well, by adding a suitable jelling substance.

We claim:

1. A process for preparation of a composition for coating, filling, binding, and protection, which comprises
    mixing rubber powder having a particle size of at most 0.4mm with an isocyanate curable polyurethane, and an aliphatic polyether glycol; and
    subjecting the mixture to a vacuum of at least 0.9 bar.

2. The process according to claim 1, wherein the subpressure is 0.8 bar, but not lower than 0.5 bar.

3. The process according to claim 1, wherein the rubber has a particle size of 0.01–0.2 mm.

4. The process according to claim 1, wherein the composition further comprises an ingredient selected from the group consisting of a zeolitic drying agent, an active aluminum oxide, an aluminum silicate and mixtures thereof.

5. A process according to claim 1 wherein the rubber powder further includes a coloring pigment.

6. The process according to claim 1, wherein the composition comprises:
    4 to 55% by weight of an isocyanate curable polyurethane;
    20 to 50% by weight of a rubber having a particle size of at most 0.4 mm;
    18 to 30% by weight of a polymer curing isocyanate; and
    1 to 5% of an aliphatic polyether glycol.

7. A process for applying a composition for coating, filling, binding, and protection prepared according to the process of claim 1, by means of high pressure, which comprises
    drawing the composition into a modified twocomponent high pressure pump together with a hardener;
    placing a pressure plate on the high pressure pump;
    pressing the pressure plate down into the composition in order to press the composition up into the pump; and
    heating the composition to greater than 40° C. in connection with said pump, such that a spray of finely dispersed composition having a pressure of 150 $kg/cm^2$ or more is obtained.

8. The process according to claim 7, wherein the composition comprises:
    4 to 55% by weight of an isocyanate curable polyurethane;
    20 to 50% by weight of a rubber having a particle size of at most 0.4 mm;
    1 to 5% of an aliphatic polyether glycol; and wherein the hardener comprises 18 to 30% by weight of a polymer curing isocyanate.

* * * * *

UNITED STATES PATENT AND TRADEMARK OFFICE
CERTIFICATE OF CORRECTION

PATENT NO. : 4,866,116
DATED : September 12, 1989
INVENTOR(S) : Ek et al.

It is certified that error appears in the above-identified patent and that said Letters Patent is hereby corrected as shown below:

Col. 1, line 37, "attach" should read --attack--

Col. 2, line 22, "immediately" should read --intimately--;

Col. 3, line 10, "$NH_{4OH}$" should read --$NH_4OH$--;

Col. 4, line 1, "risk" should read --fire risk--;

Col. 4, lines 39-40 "twocomponent" should read --two-component--.

Signed and Sealed this

Twelfth Day of May, 1992

Attest:

DOUGLAS B. COMER

Attesting Officer     Acting Commissioner of Patents and Trademarks